United States Patent Office 3,091,676
Patented May 28, 1963

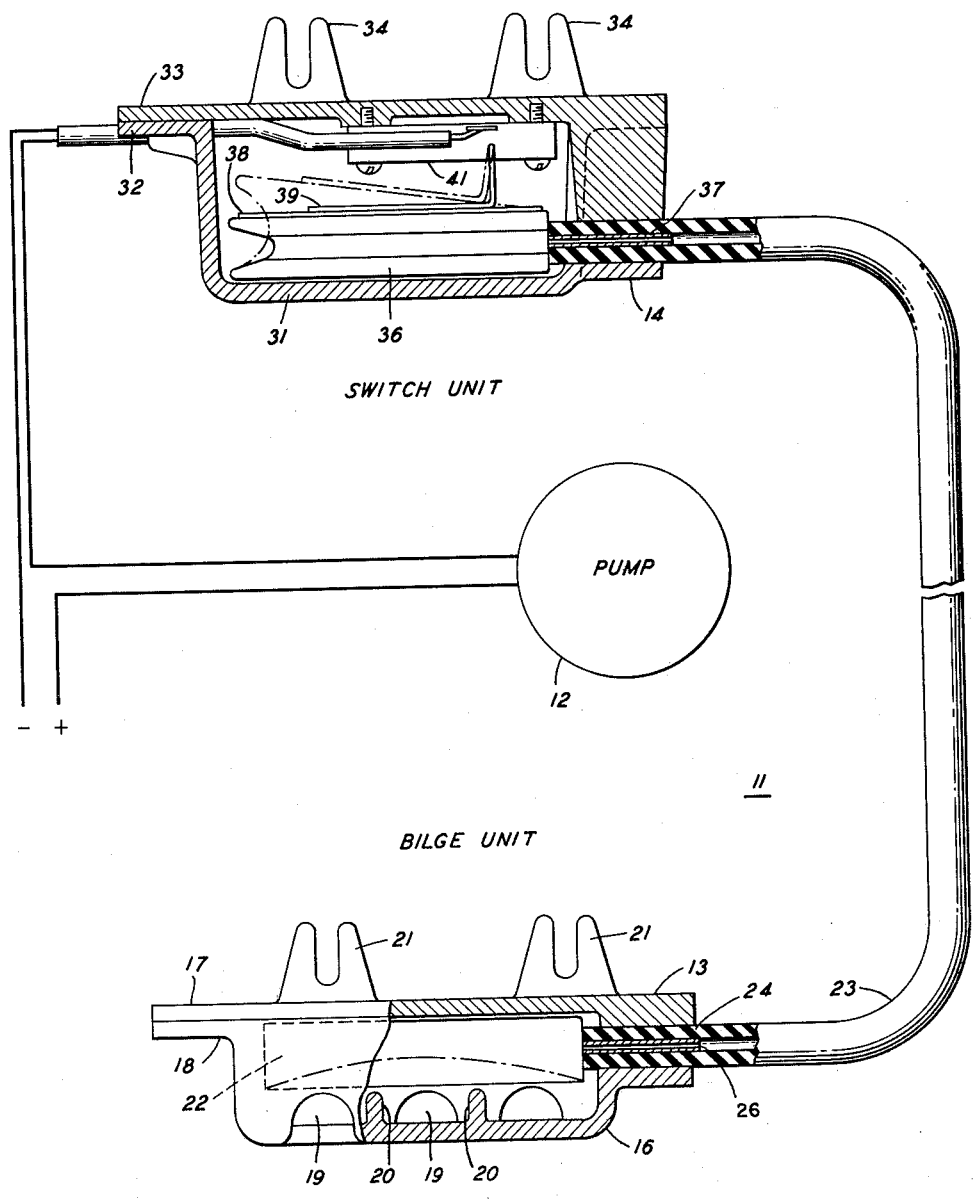

3,091,676
FLUID LEVEL CONTROL SYSTEM
Arthur H. Koster, R.D., Califon, N.J.
Filed Dec. 18, 1959, Ser. No. 860,510
5 Claims. (Cl. 200—83)

This invention relates to pumping systems, and, more particularly, to a control system responsive to a change in liquid level for controlling the action of a pump.

In liquid level responsive pumping systems, such as, for example, a bilge pumping system in a boat, in general there are provided a sensing mechanism for detecting a liquid level change and a pump actuated in some manner in response to an action initiated by the sensing mechanism. In the case of a bilge pump system, the sensing mechanism generally is a level sensitive device which, upon an increase in water level and hence an increase in pressure actuates an electrical switch which in turn actuates an electrical pump to reduce the water level. When the water level is reduced sufficiently the sensing device opens the switch, thereby turning off the pump.

Heretofore such systems have, in general, required the switch mechanism and electrical circuitry to be within or adjacent the bilge water. While such an arrangement permits simplification of the system, the close proximity of the water and the electrical elements almost invariably results in electrolytic action which, over a period of time, produces serious damage in the metal parts and apparatus on the boat. In order to overcome this disadvantage, it has been necessary, in the past, to resort to quite complicated systems, with the attendant disadvantages of cost, difficulty of maintenance, and general unreliability.

Still another disadvantage that is characteristic of substantially all bilge pump control systems is the tendency of such devices to respond to a change in water level or pressure due to rolling of the boat, with the result that in any but the most calm waters there is a constant starting and stopping of the bilge pump.

Accordingly, it is an object of this invention to eliminate all danger of electrolysis in a bilge pump control system.

It is another object of this invention to prevent electrolytic action with a bilge pump control that is simple, reliable, and requires virtually no maintenance.

It is a further object of this invention to prevent actuation of the bilge pump in response to false indications of water level change such as are produced by rolling of the boat.

These and other objects of my invention are accomplished in an illustrative embodiment thereof which comprises a pressure sensitive air filled member mounted within the bilge at a location near the maximum permissible level of bilge water. A second pressure sensitive sack or diaphragm member is mounted in the boat well removed from the bilge water and is connected to the interior of the first member by a length of flexible tubing. Mechanically connected to the exterior of the second member is an electrical switch actuation lever. In operation, when the bilge water level rises, the first member is compressed due to the increased water pressure. This in turn forces the air through the flexible tubing to the second member, causing it to expand. When it expands, the switch actuating lever is moved, causing the switch to close and turn on the bilge pump. When the water level in the bilge has been lowered, the pressure on the first member is relieved and the second member collapses due to atmospheric pressure, the air therein returning to the first member.

It is a feature of this invention that the bilge pump control depends upon a change in air pressure in two flexible air chambers to turn the pump on or off.

It is another feature of this invention that an air flow metering member is mounted within the tubing connecting the two air chambers which impedes the flow of air therebetween. By proper choice of the metering member, the actuation of the bilge pump can be delayed for several seconds, thereby preventing actuation in response to momentary changes in water level resulting from rolling of the boat.

These and other features of my invention will be more readily apparent from the following detailed description taken in conjunction with the accompanying drawing, in which:

FIG. 1 is a diagrammatic view of the bilge pump control system of the present invention.

In FIG. 1 there is shown a bilge pump control system 11 for controlling the action of a bilge pump 12. Control system 11 comprises two control elements 13 and 14, the details of which will be explained more fully hereinafter. Control element 13 is mounted in the bilge at a suitable location, preferably an inch or so below the maximum permissible level of water in the bilge, while element 14 is mounted at any convenient location in the boat in the general vicinity of element 13 but well removed from the bilge and the water.

Element 13 comprises a housing member 16 of metal or other suitable material, and consisting of two sections 17 and 18. Member 18 has a plurality of holes 19 therein for permitting the easy passage of water. Member 17 is provided with a pair of mounting lugs 21 to facilitate mounting the unit in the bilge. Within housing member 16 is a hollow flexible member or sack 22 which forms an air chamber. Sack 22 which is preferably, although not necessarily, box shaped, is preferably made of high durability neoprene or the like capable of withstanding the damaging effects of water. Sack 22 is supported within housing 16 by ribs 20 formed in member 18. The walls of member 22 are sufficiently flexible so that approximately an inch of water will cause the walls to flex, compressing the air within sack 22. Connected hermetically to one end of member 22 and communicating with the interior thereof is a flexible tube 23 of neoprene or other suitable material. In assembly, when members 17 and 18 are joined together, tube 23 is securely held in place within an aperture 24 formed by members 17 and 18. Inside of tube 23 and communicating with the interior of sack 22 is a metering tube 26 of brass or other suitable material. Tube 26 performs a dual function. It prevents the passage within tube 23 from being closed by pressure exerted by members 17 and 18. Its principle function, however, is to impede the flow of air, the reason for which will be explained more fully hereinafter.

Mounted to the other end of tube 23, which may be any convenient length from four to eight feet or more long, is control unit 14. Unit 14 is, as pointed out previously, mounted in the boat at some convenient, dry location. Unit 14 comprises a housing 31 which is formed by two members 32 and 33 of metal or other suitable material. Member 33 is provided with a pair of mounting lugs 34 for convenience of mounting the unit.

Within housing 31 is a hollow flexible member or sack 36 which forms an air chamber. Like sack 22, sack 36 is made of high durability neoprene or other suitable material. Unlike sack 22, however, sack 36 is bellows-shaped. Tube 23 is hermetically connected to sack 36 and communicates with the interior thereof in the same manner as with sack 22. Inside of tube 23 and communicating with the interior of sack 36 is a metering tube 37 which is substantially the same as, and serves the same functions as metering tube 26.

Mounted on the top surface of sack 36 is a thin plate 38 of metal or other suitable material. Plate 38 rests upon the top of member 36. Affixed to plate 38 as by welding or brazing is the lever or crank arm 39 of a switch 41. Switch 41 may be any one of a number of well known types, that shown here being by way of illustration only. Switch 41 is in circuit between a source of power, not shown, such as a battery, and the bilge pump 12. In the arrangement as illustrated in FIG. 1, switch 41 is normally open, hence the pump 12 is normally off.

In operation, when the water in the bilge rises to its maximum permissible level, the pressure of the water causes sack 22 to be compressed, as shown by the dashed line in FIG. 1. When this occurs, the air within the sack is compressed and is forced out through tube 23. The pressure of the air from sack 22 forces air into the sack 36, which because of its configuration, is caused to expand as shown by the dashed line in FIG. 1, which in turn moves switch crank 39 to the position shown by the dashed lines, thereby closing the switch. With switch 41 closed, pump 12 commences to operate and the water in the bilge is pumped out. As the water level in the bilge drops, the pressure on sack 22 decreases until such time that the pressure on sack 36 is greater. When this occurs, the air in sack 36 passes through tube 23 to sack 22 and sack 36 collapses to its normal state, thereby opening switch 41 through the movement of crank 39, and turning off pump 12.

Quite often, in rough water, the boat will be subjected to intermittent rolling and pitching. When the boat rolls, for instance, it can be appreciated that the level of the bilge water will be momentarily raised on one side of the bilge and lowered on the other. Such action would ordinarily cause the control system to turn the pump on when the boat rolled, and turn it off when it rolled back. Thus the pump would be intermittently turned on and off at frequent intervals. To prevent this, metering tubes 26 and 37 are chosen to have an inside diameter such that they offer considerable resistance to the flow of air therethrough. By proper selection of this inside diameter, the actuation of switch 41 can be delayed for several seconds after water pressure compresses sack 22. Thus, when the boat rolls, increasing the pressure on sack 22, switch 41 is not immediately actuated. As the boat rolls back, the pressure on sack 22 is relieved before the switch has been actuated, hence the pump remains off.

In like manner, if the bilge water is too high, the pump will continue to run until the water level is lowered, despite rolling of the boat.

From the foregoing, it can readily be seen that the present invention provides a reliable control, free of the damaging effects of water and electrolysis, and remarkably simple both in structure and maintenance.

While in the foregoing a preferred embodiment of my invention has been shown, it is to be understood that such embodiment is by way of illustrating the present invention. Other embodiments might occur to workers in the art without departing from the spirit and scope of the appended claims.

What is claimed is:

1. A pump control system comprising, in combination, a switch, first external pressure sensitive means comprising a sealed hollow flexible member forming an air chamber, said first means being located within a fluid container, second external pressure sensitive means responsive to a change in pressure in the chamber of said first means for controlling said switch, said second means comprising a sealed hollow flexible member forming an air chamber, said second means being located adjacent said switch, a hollow member forming an air passage communicating at one end with the interior of said first means and at the other end with the interior of said second means, said member being hermetically sealed to both said first and second means to form an air flow passage between said first and second means, said first and second means and said member defining a sealed air system, and means within said hollow member for impeding the flow of air therethrough whereby there is a finite delay in the response of said second means to a change in pressure in said first means.

2. A fluid level control system as claimed in claim 1 wherein said means for impeding the flow of air in said hollow member comprises a rigid tubular member having an inside diameter smaller than the inside diameter of said hollow member.

3. A fluid level control system as claimed in claim 2 wherein said rigid tubular member is located within said hollow member adjacent one end thereof.

4. A fluid level control system as claimed in claim 3 wherein a second rigid tubular member is located within said hollow member adjacent the other end thereof.

5. A pump control system comprising, in combination, means comprising first and second external pressure sensitive flexible members forming air chambers and a flexible hollow member interconnecting said air chambers, said first and second members and said hollow member defining a sealed air system, said first member being adapted to be deformed by external fluid pressure upon an increase in fluid level whereby the air in said chamber is compressed, said second member being adapted to expand when the air in said first member is compressed, a switch adjacent said second member adapted to be actuated upon expansion of said second member whereby the pump is actuated, and means within said flexible hollow member for delaying actuation of said switch a finite time after the increase in fluid pressure on said first member.

References Cited in the file of this patent
UNITED STATES PATENTS

| | | |
|---|---|---|
| 1,076,091 | Allen | Oct. 21, 1913 |
| 1,232,456 | Bliss | July 3, 1917 |
| 1,619,103 | Doman | Mar. 1, 1927 |
| 1,809,642 | Sperry | June 9, 1931 |
| 1,836,058 | Bancroft | Dec. 15, 1931 |
| 1,925,836 | Johnsson | Sept. 5, 1933 |
| 2,187,346 | Grace | Jan. 16, 1940 |
| 2,226,325 | Sandford | Dec. 24, 1940 |
| 2,275,066 | Otterbourg | Mar. 3, 1942 |
| 2,404,597 | McClain | July 23, 1946 |
| 2,488,506 | Bernhardt | Nov. 15, 1949 |
| 2,562,847 | Spencer | July 31, 1951 |
| 2,834,845 | Nielsen | May 13, 1958 |
| 2,838,629 | Panzenhagen | June 10, 1958 |
| 2,922,002 | Gilman | Jan. 19, 1960 |